UNITED STATES PATENT OFFICE.

CARL BOSCH AND ALWIN MITTASCH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PRODUCING AMMONIA.

1,118,628.  Specification of Letters Patent.  Patented Nov. 24, 1914.

No Drawing.   Application filed August 16, 1912. Serial No. 715,331.

*To all whom it may concern:*

Be it known that we, CARL BOSCH and ALWIN MITTASCH, subjects, respectively, of the King of Prussia and the King of Saxony, residing at Ludwigshafen-on-the-Rhine, Germany, have invented new and useful Improvements in Producing Ammonia, of which the following is a specification.

Our invention relates to the synthetic manufacture of ammonia by passing a mixture of hydrogen and nitrogen over a catalytic agent. We have discovered that we can obtain ammonia in good yield by passing a mixture of nitrogen and hydrogen over a mixture of metals or metallic compounds, such that there is present a metal or other body which has considerable power of taking up nitrogen, and also a metal or other body which is capable of taking up hydrogen to a considerable degree. If desired, more than two of the metals or metallic compounds of the kind having the respective qualities aforesaid can be employed, and it is preferred to employ such quantities of each kind that there is no very great preponderance of that, or those, of the one or of the other kind. It is sometimes advantageous to add to the mixture other compound or compounds which promote the production of ammonia.

The following are examples of how this invention can be carried into practical effect, but the invention is not confined to these examples.

Example 1: Heat ammonium molybdate so that a part of the ammonia is driven off and then soak the porous grains in a concentrated solution of palladium nitrate, so that 20 per cent. of palladium nitrate is employed compared with the ammonium molybdate. If desired, two per cent. of uranium nitrate can be added to the palladium nitrate. Calcine the mixture until the nitrate is decomposed, reduce the mass with hydrogen and introduce it into a contact tube, or the like, and pass a current of pure dry hydrogen and nitrogen, in molecular proportions, over the mass at 600° C. and a pressure of 150 atmospheres.

Example 2: Work up 2 parts by weight of ammonium tungstate (free from alkali) and from 1 part, to 2 parts, by weight of nickel nitrate to form a contact mass, as described in the foregoing example, and place it in a contact tube, or the like, and pass a current of pure dry hydrogen and nitrogen over the mass under the conditions stated in Example 1.

Now what we claim is:—

1. The process of producing ammonia by passing a mixture of hydrogen and nitrogen over a catalytic mixture containing a body which has considerable power of taking up nitrogen and also a body which has considerable power of taking up hydrogen.

2. The process of producing ammonia by passing a mixture of hydrogen and nitrogen over a catalytic mixture containing a metal which has considerable power of taking up nitrogen and also a metal which has considerable power of taking up hydrogen.

3. The process of producing ammonia by passing a mixture of hydrogen and nitrogen over a catalytic mixture containing tungsten and nickel.

In testimony whereof we have hereunto set our hands in the presence of two subscribing witnesses.

CARL BOSCH.
ALWIN MITTASCH.

Witnesses:
ERNEST G. EHRHARDT,
JOSEPH FEIFFER.